B. W. KING.
COMPUTING SCALE.
APPLICATION FILED DEC. 23, 1920.
1,408,703.
Patented Mar. 7, 1922.
3 SHEETS—SHEET 1.
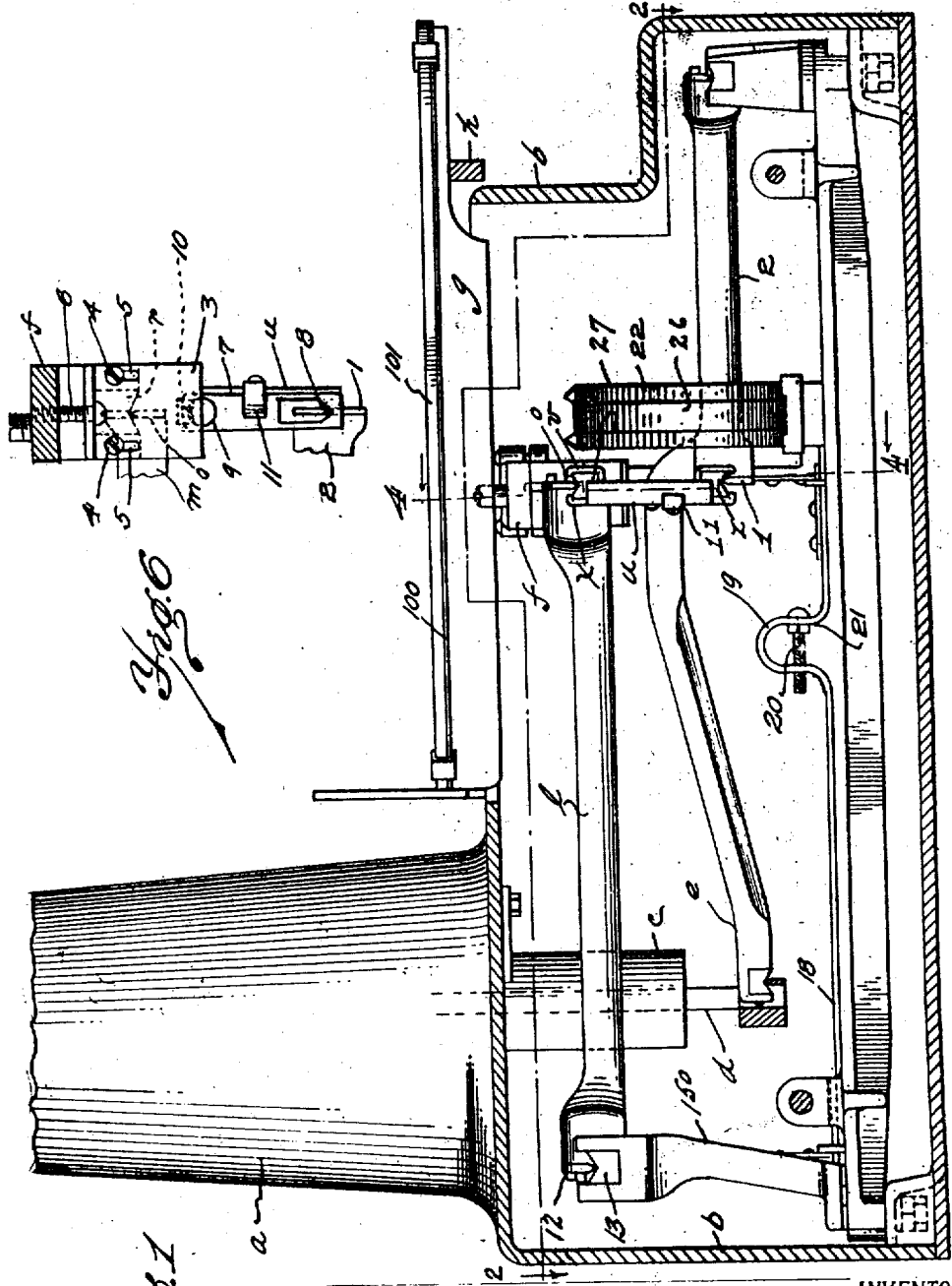
INVENTOR.
BERT W. KING
BY
[signature]
ATTORNEY.

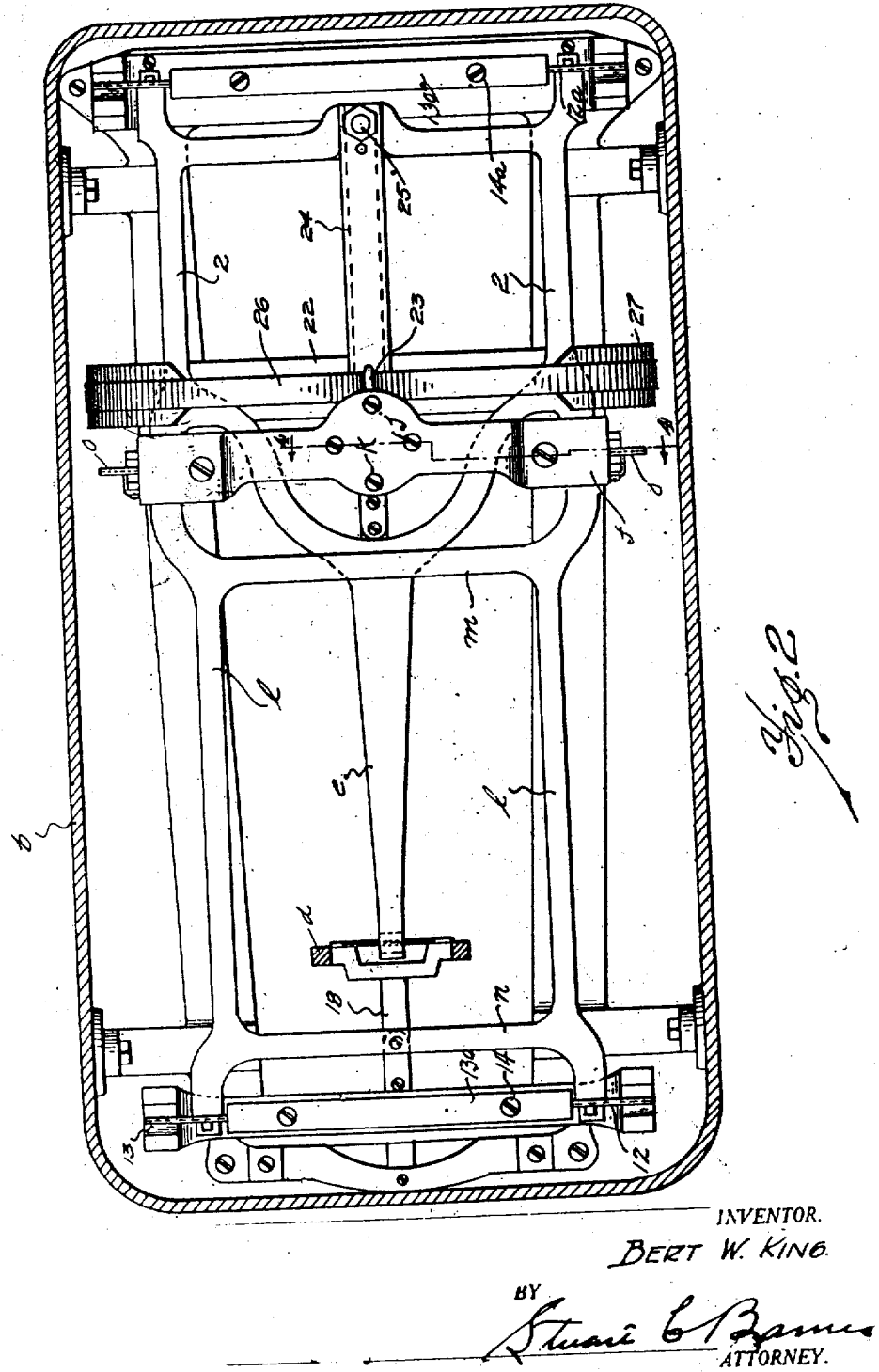

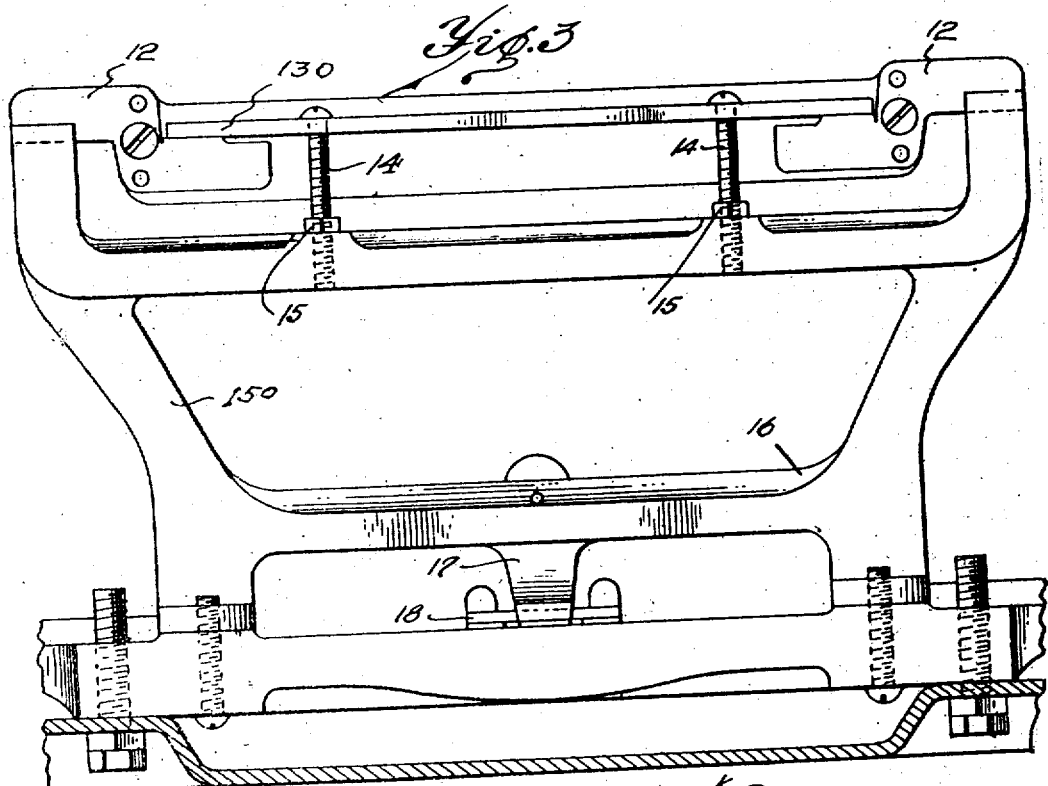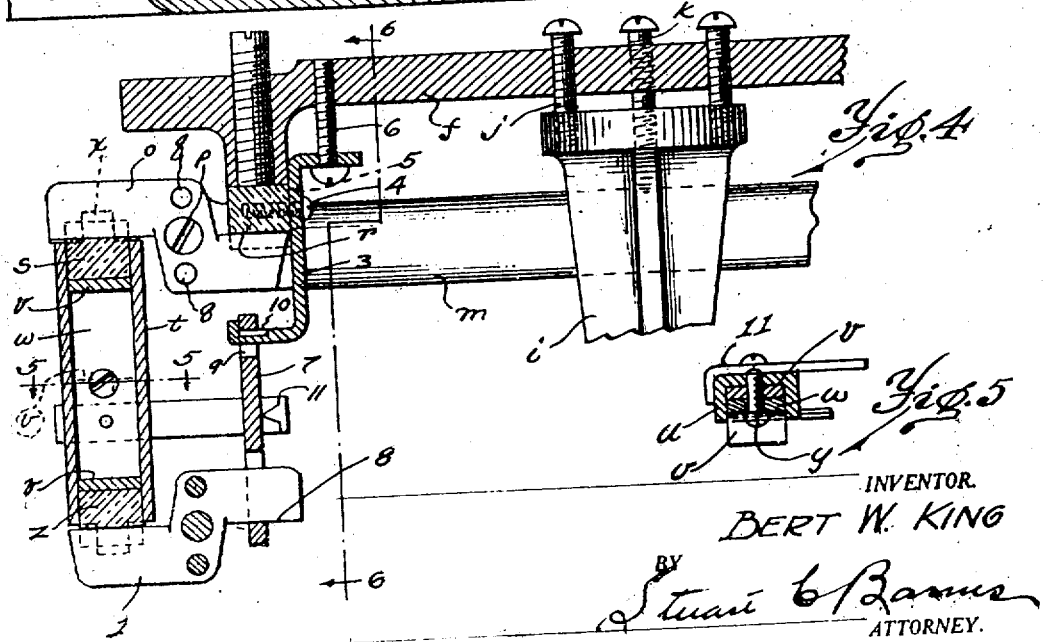

UNITED STATES PATENT OFFICE.

BERT W. KING, OF DETROIT, MICHIGAN, ASSIGNOR TO BARNES SCALE COMPANY, OF DETROIT, MICHIGAN, A CORPORATION OF MICHIGAN.

COMPUTING SCALE.

1,408,703.  Specification of Letters Patent.  Patented Mar. 7, 1922.

Application filed December 23, 1920. Serial No. 432,808.

*To all whom it may concern:*

Be it known that I, BERT W. KING, a citizen of the United States, residing at Detroit, in the county of Wayne and State of Michigan, have invented certain new and useful Improvements in Computing Scales, of which the following is a specification.

This invention relates to computing scales, and has for its object a computing scale provided with a bearing arrangement which prevents the platform from tilting and riding up on its bearing when a load is put on one side of the platform. Another feature of the invention is a simple arrangement whereby the drum-operating lever is prevented from jumping out of or riding up its bearings without the use of the customary counterweight.

The novel arrangement of the operating parts is such that the platform is really supported by a pair of links whose only purpose is to maintain it in upright position while the thrust of the platform is communicated directly to the drum-operating lever, which plays no part in supporting the platform in its erect position. These features will be best understood after the detail is explained.

In the drawings,—

Fig. 1 is a cross section through the base of the scale housing showing the operating parts mainly in side elevation.

Fig. 2 is a plan view of the operating parts taken on the line 2—2 of Fig. 1.

Fig. 3 is an end elevation of the operating parts taken from the left hand end of Fig. 1.

Fig. 4 is a fragmentary section taken on the line 4—4 of Fig. 1.

Fig. 5 is a cross section taken on the line 5—5 of Fig. 4.

Fig. 6 is a section on the line 6—6 of Fig. 4.

The pedestal is designated $a$; the base of the housing $b$; $c$ indicates the usual dash pot; $d$ the yoke that straddles the dash pot and that at its lower end has a knife edge connection with the drum-actuating lever $e$. The platform is designated $f$ and is provided with the usual glass slab supporting frame 100 and with aprons $g$ and $h$ which extend down slightly over the top of the base $b$. This platform is supported upon the platform stem $i$ by means of the usual spacing screws $j$ and the binding screws $k$. This platform stem . preserved in vertical position by reason of the usual parallel levers or links. In this case the parallelogram is strictly speaking one of links, namely, the parallel upper links $l$, $l$, connected by a cross bar $m$ and a cross bar $n$. On the swinging end of these links is supported a pair of double edge knives $o$, the same being screwed to the ends of the upper levers or links by the screws $p$ and prevented from turning by the dowel pins $q$. An agate bearing $r$ is soldered into the depending leg of the platform $f$ and is provided with the usual V slot which engages over the upper knife edge of the double edge knife $o$. In line with this upwardly-directed edge is a downwardly-directed edge which engages in the V agate block $s$ of the push link $t$. This push link is made up of a channel strip $u$ (see Fig. 5) to which is clamped a pair of agate block rests $v$, $v$ by means of the spacing plate $w$. The channel strip $u$ has reduced portions at top and bottom turned over to form hooks $x$ which engage the outer ends of the agate blocks and in conjunction with the agate block rests $v$ form a secure clamp for the agate blocks when the spacing plate $w$ is screwed to the channel strip by the screw $y$. This forms a very convenient way to assemble the upper and lower agate blocks $s$ and $z$ of the push link. The lower agate block $z$ of the push link engages with the knife edge of the double edged knife 1 which is secured to the ends of the side bars 2 that are part of the Y-like casting that forms the drum-actuating lever $e$. These double edged knives 1 are provided with a second knife edge downwardly-directed and in line with the upwardly-directed knife edge. This second downwardly-directed knife edge has a very important functional connection with the platform, as will presently appear.

Screwed to the side of the depending leg of the platform is a Z-shaped hanger 3, the screws 4 passing through slots 5 in the hanger. Through the upper bar of this Z hanger runs an adjusting screw 6 into the bottom of the platform $f$. Hence the screws 4 and 6 may be loosened and the hanger dropped down as far as it will go and then the screw 6 turned carefully to pull the hanger up to the precise point of adjustment required to bring the link 7 nicely up against the downwardly-directed knife edge 8. When the proper position has been secured the adjustment may be made permanent by tightening the screws 4. It will be noticed that this link 7 has a circular opening 9 that engages with the knife edge 10 filed or ground in the upper surface of the bottom bar of the Z hanger 3. Hence it will be seen that the hanger 3 and the link 7 break at the point 10. If a load be placed on the extreme front or rear of the platform slab 101, its natural tendency is to tip the platform stem and thereby cause the agate block to shift on the knife edge of the upper lever or link. This, of course, introduces an error into the weighing operation. By my improved construction any tendency to tilt the platform stem due to an eccentric load is resisted by the link and the hanger pulling upwardly on the downwardly-directed knife edge of the knife 1 secured to the drum-actuating lever. In short, the knife edges, directed away from each other, of the knives o and 1 are connected together by what amounts to a clamp that breaks near its center of necessity because one of the members of the clamp, to-wit, the platform, is constrained to always remain in a vertical position. The knife edges directed toward each other are connected together by the push link, which being not restrained to remain in any given position like the platform, can be a rigid thrust member. This push link serves to communicate the thrust of the platform substantially directly from the platform and not through an upper lever. Of course, in truth a thrust does come through the upper lever but inasmuch as the thrust of the platform is on a point along the lever in a direct line with the thrust from the lever to the push link, the lever is really no lever at all but simply a link or radius arm that in connection with the lower check link constrains the platform stem to always remain in vertical position.

The push link is substantially parallel with the platform stem when the scale registers half its capacity. This arrangement of push link has an important relation with the clamp formed by the hanger 3 and link 7. If the push link were removed from the point of parallelism with a straight line drawn through the knife supporting the platform and the knife edge 8, this way of tying a platform from tipping in its bearing would be an impossibility for the reason that the knife edges have to be aligned in pairs.

A stamped strip in the form of a yoke 11 engages between the push link and the clamping link to hold the clamping link in a substantially vertical plane.

The upper link or lever l is prevented from jumping out of its bearings or riding up on its bearings by using a double edged knife 12 (see Fig. 3), the downwardly-directed edge of which engages in the V agate block 13 and the upward edge of which is in line with the downwardly-directed edge and engages against the clamping bar 130 which may be loosened up or clamped down upon the upwardly-directed knife edges by means of the screws 14 which are locked by the jam-nuts 15 and which turn into the cross bar of the fulcrum support 150. Clamped to the lower cross bar 16 of the fulcrum support is a hanger 17 with suitable knife edges (not detailed) that supports the check link 18. The check link is provided with a valuable improvement in adjustability. Note that it is bent into U form at 19 (Fig. 1) and that the screw 20 is threaded into one wall of the U, the check link being constructed of spring material. By loosening the lock nut 21 and turning the screw 20 the length of the check link may be adjusted slightly to accord it with the upper links or levers.

A suitable thermostat 22 is shown in the drawings, but inasmuch as it is no part of the invention herein claimed and as other thermostats suitable for this purpose are shown in the prior art, no detailed description is necessary other than to say that a hook 23 is secured to the arm 24 and bolted to the drum-actuating lever 25. This hook 23 engages the ribbon 26 which passes over the thermostatic C-like spring elements 27. This construction is claimed in a co-pending application No. 381,246.

In the claims, the lever e is designated a drum actuating member but, obviously it could be used with other indicating or registering means and hence this designation must be understood as one of description rather than limitation.

It will be apparent that, although the thrust link must be in line with the platform bearing to make possible the use of the clamp that prevents the tipping of the platform, on the other hand the clamp or tie may be used anywhere where the thrust link and knife edge bearing are used between the levers and performs the useful function of holding the knife edges into the bearings on the thrust link.

The same arrangement as is used for keeping the upper lever l from jumping out of its bearings is used on the opposite end of the scale at the fulcrum for the drum-actuating lever, the parts being similarly designated except for the addition of an "a", namely, 12ª designates the double edged knife, 130ª designates the clamping bar, and 14ª designates the clamping screws.

What I claim is:

1. In a computing scale, the combination of a platform, a platform stem below the platform, parallel swinging members supporting the same, a drum-actuating lever, and a thrust link connection with the drum-actuating lever having a bearing substantially at the same point along the upper swinging member as the point of connection of the platform and stem therewith, said thrust link serving to communicate the movement of the platform to the drum-actuating lever.

2. In a computing scale, the combination of a platform, a platform stem, parallel swinging members supporting the same, a separately-fulcrumed drum-actuating lever, and an actuating connection between the upper swinging member and the drum-actuating lever having a bearing on the upper swinging member at substantially the same point therealong as the point of connection between the platform stem and platform and the said lever.

3. In a computing scale, the combination of a platform, a platform stem, parallel swinging members for supporting the same, a drum-actuating lever provided with a pivot member, a push link between the upper swinging member and the drum-actuating lever having a bearing on the upper swinging member at substantially the same point as the connection between the platform and platform stem with said lever and a bearing on the drum-actuating lever aligned with said pivot, and a clamp depending from the platform and engaging with the pivot member for avoiding the derangement of the connection between the platform and stem and the upper swinging member.

4. In a computing scale, the combination of a platform, a platform stem, parallel swinging members for supporting the same, a drum-actuating lever, a push link between the upper swinging member and the drum-actuating lever having its connection with the upper swinging member substantially at the same point as the connection of the platform and platform stem therewith, a pivot member aligned with the point of connection between the push link and drum-actuating lever, and a clamp extending from the platform and stem down to and engaging with the said pivot member to prevent derangement of the platform and stem upon their support.

5. In a computing scale, the combination of a platform, a platform stem, parallel swinging members for supporting the same, a drum-actuating lever, a push link connecting the upper swinging member with the drum-actuating lever and having a bearing with the upper swinging member substantially at the same point along the member as the connection between the platform and stem and the said member, a pivot member aligned with the point of engagement of the lower end of the push link with the drum-actuating lever, and a clamp breaking between its two ends for tying the lower side of the said pivot member to the platform and stem to prevent the derangement of the connection between the platform and stem and the upper swinging member.

6. In a computing scale, the combination of a swinging member, a lever, a double edged knife having aligned but oppositely-directed edges secured to the swinging member, a double edged knife having oppositely-directed knife edges in alignment and secured to the lever, a push link connecting the opposed knife edges of the two knives, and a tie operating to tie the non-opposed edges of the two knives together to prevent derangement of the knife edges and their engaging members.

7. In a computing scale, the combination of a swinging member, a lever, a double edged knife having oppositely-directed but aligned edges and secured to the swinging member, and a second double edged knife having oppositely-directed but aligned edges secured to the lever, a push link engaging between the opposed knife edges of the two knives, and a tie breaking between its ends operating to tie the non-opposed knife edges of the two knives together to prevent derangement of the knife edges and bearings.

8. In a computing scale, the combination of a member, a swinging member supporting the same, a push link, a double edged knife secured to the swinging member and having an upper knife edge supporting the first-mentioned member, a lever provided with a double edged knife, a push link engaging between the opposed edges of the two said knives, and a clamp connecting the first-mentioned member with the downwardly-directed knife edge of the knife secured to the lever and provided with means for taking up the looseness in the clamp.

9. In a computing scale, the combination of a member, a swinging member supporting the same, a knife having upwardly and downwardly-directed edges secured to the swinging member, a lever, a knife having oppositely-directed edges secured to the lever, a push link connecting the opposed edges of the two knives, a V bearing connected with the first-mentioned member for supporting the same on the upwardly-directed edge of the knife secured to the swinging member, a vertically-adjustable hanger supported on the first-mentioned member, and a link having a hinging connection with said hanger and adapted to engage the downwardly-directed edge of the knife secured to the lever.

10. In a computing scale, the combination of a member, a swinging member supporting the same, a V bearing supporting the first-mentioned member, a knife with upwardly and downwardly directed edges secured to the swinging member, a lever, a second knife with upwardly and downwardly directed edges secured to the lever, a link connecting the opposed edges of the two knives, a hanger roughly in the form of a Z adjustably connected with the first-mentioned member and provided with a knife edge, and a link engaging the knife edge on the hanger and engaging the downwardly-directed edge of the knife secured to the lever.

11. In a computing scale, the combination of a fulcrum support comprising one or more V bearings, a lever, a double edged knife having aligned but oppositely-directed edges and secured to the lever, and an adjustable bar adapted to be clamped down on the upwardly-turned edge of the knife while the downwardly-turned edge engages in the V bearing.

12. In a computing scale, the combination of a fulcrum support provided with a pair of V-like bearings, a lever, a pair of double edged knives secured thereto and having oppositely-directed but aligned edges in each knife, the downwardly-directed edges engaging in the V bearings, and a bar reaching from one knife to the other and adjustably clampable upon the upwardly-directed knife edges to hold the downwardly-directed knife edges properly in their bearings.

13. In a computing scale, the combination of a drum-actuating lever, a fulcrum support therefor, and two aligned but oppositely-directed knife edges between the drum-actuating lever and the support for supporting the lever upon the fulcrum support and preventing shifting in the bearings.

14. In a computing scale, the combination of a drum-actuating lever, a fulcrum support, and two aligned but oppositely directed knife edges and V bearings between the drum-actuating lever and the support for supporting the lever upon the support and preventing shifting in its bearings.

15. In a computing scale, the combination of a fulcrum support provided with V bearings, a drum-actuating lever having one or more knives having oppositely-directed but aligned edges, the downwardly-directed edges engaging in the V bearings, and means for engaging the upwardly-directed edges for holding the downwardly-directed edges in their bearings.

16. In a computing scale, the combination of a lever or link member comprising a straight bar except for a U-like bend therein intermediate its ends, and means for contracting or allowing the same to expand to vary the length of the lever.

17. In a computing scale, the combination of a lever or link having a portion formed into a U-like bend, a screw threaded through the two walls of such bend for contracting or allowing the bend to expand to alter the length of the lever or link.

18. In a computing scale, the combination of a platform, a platform stem, a pair of parallel swinging members for supporting the same, a separately fulcrumed drum-actuating lever, a connection between the platform and stem and the drum-actuating lever to actuate the latter, and a second connection between the same members to prevent the displacement of the platform and stem upon their support.

19. In a computing scale, the combination of a platform, a platform stem, a pair of parallel swinging members for supporting the same, a separately fulcrumed drum-actuating lever, an actuating connection between the platform and stem and the drum-actuating lever, and a second connection between the same members for preventing the derangement of the platform and stem upon their support, the said second connection being provided with a hinging joint between its ends.

20. In a computing scale, the combination of a swinging member having a knife edge pointing upwardly, a separately fulcrumed lever provided with a downwardly-pointing knife edge, a thrust connection between the swinging member and the lever provided with knife edge bearings, and a tie connection between the upwardly pointing knife edge and downwardly pointing knife edge for preventing the derangement of the bearings.

21. In a computing scale, the combination of a platform, a platform stem, a pair of parallel swinging members for supporting the same, a separately fulcrumed drum-actuating lever, and means co-operating with the drum-actuating lever for preventing the derangement of the platform and stem upon their support.

22. In a computing scale, the combination of a platform, a platform stem, a swinging member for supporting the same in vertical position, a separately fulcrumed drum-actuating lever, two knives having oppositely-directed but aligned edges, one on the swinging member and one on the drum-actuating lever, and means for connecting the knives together for both thrusting the drum-actuating lever and tying the platform to its knife edge bearing.

In testimony whereof I affix my signature.

BERT W. KING.